US010847279B2

(12) United States Patent
Kubo et al.

(10) Patent No.: US 10,847,279 B2
(45) Date of Patent: Nov. 24, 2020

(54) METHOD FOR MAKING A SULFUR-BASED POSITIVE-ELECTRODE ACTIVE MATERIAL

(71) Applicants: SUMITOMO RUBBER INDUSTRIES, LTD., Kobe (JP); NATIONAL INSTITUTE OF ADVANCED INDUSTRIAL SCIENCE AND TECHNOLOGY, Tokyo (JP)

(72) Inventors: Tatsuya Kubo, Kobe (JP); Toshikatsu Kojima, Ikeda (JP); Tetsuo Sakai, Ikeda (JP); Akihiro Yamano, Ikeda (JP); Masahiro Yanagida, Ikeda (JP)

(73) Assignees: SUMITOMO RUBBER INDUSTRIES, LTD., Kobe (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 39 days.

(21) Appl. No.: 16/298,575

(22) Filed: Mar. 11, 2019

(65) Prior Publication Data
US 2019/0207210 A1    Jul. 4, 2019

Related U.S. Application Data

(63) Continuation of application No. 15/227,135, filed on Aug. 3, 2016, now abandoned.

(30) Foreign Application Priority Data

Sep. 2, 2015  (JP) ................................. 2015-172845

(51) Int. Cl.
| | | |
|---|---|---|
| *H01B 1/04* | (2006.01) | |
| *H01B 1/10* | (2006.01) | |
| *H01M 4/133* | (2010.01) | |
| *H01M 4/136* | (2010.01) | |
| *H01M 4/587* | (2010.01) | |
| *H01M 4/36* | (2006.01) | |
| *H01M 10/0525* | (2010.01) | |
| *H01M 4/62* | (2006.01) | |
| *C08K 3/04* | (2006.01) | |
| *C08G 65/38* | (2006.01) | |
| *C08F 8/34* | (2006.01) | |
| *H01M 4/137* | (2010.01) | |

(Continued)

(52) U.S. Cl.
CPC ............. *H01B 1/04* (2013.01); *C01B 32/158* (2017.08); *C01B 32/182* (2017.08); *C01B 32/20* (2017.08); *C08F 8/34* (2013.01); *C08G 65/38* (2013.01); *C08K 3/04* (2013.01); *H01B 1/10* (2013.01); *H01M 4/133* (2013.01); *H01M 4/136* (2013.01); *H01M 4/137* (2013.01); *H01M 4/364* (2013.01); *H01M 4/587* (2013.01); *H01M 4/602* (2013.01); *H01M 4/625* (2013.01); *H01M 10/052* (2013.01); *H01M 10/0525* (2013.01); *C08L 39/06* (2013.01); *H01M 2004/028* (2013.01)

(58) Field of Classification Search
CPC ... H01B 1/04; H01B 1/10; H01B 1/12; H01B 1/124; H01B 1/125; H01B 1/127; H01B 1/128; H01B 1/24; H01M 4/133; H01M 4/136; H01M 4/137; H01M 4/1397; H01M 4/362; H01M 4/364; H01M 4/38; H01M 4/583; H01M 4/587; H01M 4/602; H01M 4/604; H01M 4/606; H01M 4/608; H01M 4/622; H01M 4/623; H01M 4/625; H01M 10/052; H01M 10/0525; C08F 8/34; C08F 112/14; C08F 126/06; C08F 126/08; C08F 126/10; C08K 3/04; C08K 3/041; C08K 3/042; C08K 3/045; C01B 32/158; C01B 32/182; C01B 32/20; C08G 65/38; C08G 65/40; C08L 39/08
See application file for complete search history.

(56) References Cited

U.S. PATENT DOCUMENTS

| | | |
|---|---|---|
| 6,117,590 A | 9/2000 | Skotheim et al. |
| 6,329,789 B1 | 12/2001 | Gavrilov et al. |

(Continued)

FOREIGN PATENT DOCUMENTS

| | | |
|---|---|---|
| CN | 102142557 A | 8/2011 |
| CN | 102160217 A | 8/2011 |

(Continued)

OTHER PUBLICATIONS

Extended European Search Report for European Application No. 18203418.1, dated Jan. 7, 2019.

(Continued)

*Primary Examiner* — Matthew R Diaz
(74) *Attorney, Agent, or Firm* — Birch, Stewart, Kolasch & Birch, LLP

(57) ABSTRACT

An object of the present invention is to provide a novel sulfur-based positive-electrode active material which can largely improve cyclability of a lithium-ion secondary battery, a positive electrode comprising the positive-electrode active material and a lithium-ion secondary battery comprising the positive electrode. The sulfur-based positive-electrode active material is one comprising: a carbon skeleton derived from a polymer composed of a monomer unit having at least one hetero atom-containing moiety, and sulfur incorporated into the carbon skeleton as the carbon skeleton is formed from the polymer by heat treatment.

13 Claims, 2 Drawing Sheets

(51) Int. Cl.
*H01M 4/60* (2006.01)
*H01M 10/052* (2010.01)
*C01B 32/158* (2017.01)
*C01B 32/20* (2017.01)
*C01B 32/182* (2017.01)
*H01M 4/02* (2006.01)
*C08L 39/06* (2006.01)

(56) References Cited

U.S. PATENT DOCUMENTS

| | | |
|---|---|---|
| 6,566,006 B1 | 5/2003 | Cheng et al. |
| 6,652,440 B1 | 11/2003 | Kovalev et al. |
| 2001/0033971 A1 | 10/2001 | Zhao et al. |
| 2011/0200875 A1 | 8/2011 | Miyuki et al. |
| 2011/0318654 A1 | 12/2011 | Janssen |
| 2012/0059128 A1 | 3/2012 | He et al. |
| 2013/0040197 A1 | 2/2013 | Liu et al. |
| 2013/0164635 A1* | 6/2013 | Schmidt ............ H01M 4/625 429/337 |
| 2013/0248779 A1 | 9/2013 | Lee et al. |
| 2014/0008233 A1 | 1/2014 | He et al. |
| 2014/0199592 A1* | 7/2014 | Pyun ............ H01M 4/043 429/213 |
| 2014/0342233 A1* | 11/2014 | Guo ............ H01M 4/139 429/231.4 |
| 2015/0118535 A1* | 4/2015 | Smith ............ H01M 10/0565 429/101 |
| 2015/0191586 A1 | 7/2015 | Haba et al. |
| 2016/0293955 A1 | 10/2016 | Hochi et al. |

FOREIGN PATENT DOCUMENTS

| | | |
|---|---|---|
| CN | 102906177 A | 1/2013 |
| CN | 103337618 A | 10/2013 |
| CN | 104860296 A | 8/2015 |
| JP | 2002-154815 A | 5/2002 |
| JP | 2011-28948 A | 2/2011 |
| JP | 2012-133918 A | 7/2012 |
| JP | 2012-150933 A | 8/2012 |
| JP | 2013-533904 A | 8/2013 |
| JP | 2014-96327 A | 5/2014 |
| JP | 2014-096327 A | 5/2014 |
| JP | 5534227 B2 | 6/2014 |
| WO | WO 00/67339 A1 | 11/2000 |
| WO | WO 2011/148357 A1 | 12/2011 |
| WO | WO 2012/132173 A1 | 10/2012 |
| WO | WO 2013/155038 A1 | 10/2013 |
| WO | WO 2015/050086 A1 | 4/2015 |

OTHER PUBLICATIONS

Extended European Search Report for European Application No. 18203419.9, dated Jan. 7, 2019.
Communication pursuant to Article 94(3) EPC for European Application No. 18203418.1, dated Jan. 17, 2020.
Communication pursuant to Article 94(3) EPC for European Application No. 18203419.9, dated Jan. 17, 2020.
Japanese Office Action dated Apr. 2, 2019, for corresponding Japanese Patent Application No. 2015-172845, with English translation.
Chinese Office Action and Search Report dated Jul. 16, 2018 for Application No. 201610645333.9, along with an English translation thereof.
English machine translation of Toshikatsu et al., JP 2014-096327A (2014).
Extended European Search Report for European Application No. 18179583.2, dated Jul. 31, 2018.
Extended European Search Report, dated Mar. 16, 2017, for European Application No. 16183529.3.
Machine translation of JP-2011-28948-A, published Feb. 10, 2011 (English and Japanese versions provided).
Machine translation of JP-2012-133918-A, published Jul. 12, 2012 (English and Japanese versions provided).
Partial European Search Report, dated Nov. 7, 2016, for European Application No. 16183529.3.
Taiwanese Office Action and Search Report, dated May 8, 2017, for Taiwanese Application No. 105126186.

\* cited by examiner

METHOD FOR MAKING A SULFUR-BASED POSITIVE-ELECTRODE ACTIVE MATERIAL

This application is a Continuation of copending application Ser. No. 15/227,135 filed on Aug. 3, 2016, and which claims priority under 35 U.S.C. § 119(a) to Application No. 2015-172845 filed in Japan, on Sep. 2, 2015, the entire contents of all of which are expressly incorporated by reference into the present application.

TECHNICAL FIELD

The present invention relates to a novel sulfur-based positive-electrode active material which can be used on a lithium-ion secondary battery, a positive electrode comprising the sulfur-based positive-electrode active material and a lithium-ion secondary battery comprising the positive electrode.

BACKGROUND ART

Since a lithium-ion secondary battery, one type of non-aqueous electrolyte secondary batteries, has a large charging and discharging capacity, it has been used mainly as a battery for portable electronic devices. Moreover, the number of lithium-ion secondary batteries used as a battery for electric automobiles has been increasing, and enhancement of performance thereof is expected.

Generally, materials comprising a rare metal such as cobalt or nickel are used as a positive-electrode active material of a lithium-ion secondary battery. However, due to the fact that rare metals are small in the distributed amount, not always easily available and additionally expensive, a positive-electrode active material using a material that replaces a rare metal has been required. Further, in the case of a positive-electrode active material comprising an oxidized compound, oxygen in the positive-electrode active material is released due to overcharging, or the like, and as a result, an organic electrolyte and a current collector are oxidized and burnt, which may cause firing, explosion, and the like.

On the other hand, a technique of using sulfur as a positive-electrode active material is known. In the case where sulfur is used as a positive-electrode active material, this sulfur is easily available compared to rare metals and is inexpensive, and has a further advantage that a charging and discharging capacity of a lithium-ion secondary battery can be made larger than the present state. For example, it is known that a lithium-ion secondary battery using sulfur as a positive-electrode active material can achieve about 6 times larger charging and discharging capacity than a lithium-ion secondary battery using lithium cobalt oxide which is a general positive-electrode material. Further, sulfur is low in reactivity compared to oxygen, and there is a less risk of causing firing, explosion, and the like due to overcharging. However, the lithium-ion secondary battery using elemental sulfur as the positive-electrode active material has a problem that a battery capacity is deteriorated through repeated charging and discharging. That is, elemental sulfur likely generates a compound with lithium when discharging and since the generated compound is soluble into a nonaqueous electrolyte (for example, ethylene carbonate and dimethyl carbonate and the like) of the lithium-ion secondary battery, the charging and discharging capacity is gradually reduced through repeated charging and discharging due to the sulfur eluting into the electrolyte.

In order to improve cyclability (a property of maintaining a charging and discharging capacity in spite of repeated charging and discharging) by preventing sulfur from eluting into an electrolyte, a positive-electrode active material comprising sulfur and a material other than sulfur (for example, a carbon material) has been proposed. For example, Patent Document 1 discloses a technique of using a specific carbon polysulfide comprising carbon and sulfur as main component elements. Further, Patent Document 2 discloses a sulfur-based positive-electrode active material obtained by heat-treating a mixture of polyisoprene and sulfur powder.

PRIOR ART DOCUMENTS

Patent Documents

Patent Document 1: JP 2002-154815 A
Patent Document 2: JP 2012-150933 A

SUMMARY OF THE INVENTION

Problem to be Solved by the Invention

However, there is still a room for improving cyclability of a lithium-ion secondary battery. An object of the present invention is to provide a novel sulfur-based positive-electrode active material which can largely improve cyclability of a lithium-ion secondary battery, a positive electrode comprising the positive-electrode active material and a lithium-ion secondary battery comprising the positive electrode.

Means to Solve the Problem

The present inventors have made intensive studies to solve the above-mentioned problem and as a result, have found that a sulfur-based positive-electrode active material exhibiting excellent properties can be obtained by heat-treating a polymer composed of a given monomer unit having at least one hetero atom-containing moiety and sulfur under a non-oxidizing atmosphere. The present inventors have made further studies and have completed the present invention.

Namely, the present invention relates to:

[1] a sulfur-based positive-electrode active material comprising:

a carbon skeleton derived from a polymer composed of a monomer unit having at least one hetero atom-containing moiety, and sulfur incorporated into the carbon skeleton as the carbon skeleton is formed from the polymer by heat treatment, wherein the hetero atom-containing moiety is a moiety having a group selected from the group consisting of a monovalent functional group having at least one hetero atom selected from the group consisting of O, S, P and N, a heterocyclic group having at least one hetero atom selected from the group consisting of O, S, P and N, and a group represented by $-S_a-$ ("a" is an integer of 2 to 4),

[2] the sulfur-based positive-electrode active material according to the above [1], wherein the polymer composed of a monomer unit having at least one hetero atom-containing moiety is one represented by the following formula (1) or (2):

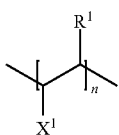

wherein $R^1$ represents a hydrogen atom or an alkyl group, the alkyl group is one having 1 to 4 carbon atoms, more preferably methyl, $X^1$ represents a group having a monovalent functional group having hetero atom selected from the group consisting of O, S, P and N, or a group having a heterocyclic group having hetero atom selected from the group consisting of O, S, P and N, "n" represents an integer, or

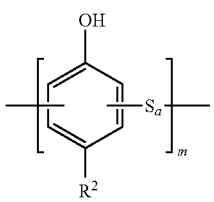

wherein $R^2$ represents an alkyl group, the alkyl group is one having 5 to 12 carbon atoms, more preferably one having 6 to 10 carbon atoms, further preferably one having 7 to 9 carbon atoms, most preferably one having 8 carbon atoms, "a" represents an integer of 2 to 4, "m" represents an integer of 2 to 12,

[3] the sulfur-based positive-electrode active material according to the above [1] or [2], wherein the heterocyclic group is a 5- to 14-membered heterocyclic group having 1 to 3 hetero atoms selected from the group consisting of O, S, P and N,

[4] the sulfur-based positive-electrode active material according to any one of the above [1] to [3], wherein the monovalent functional group is at least one selected from the group consisting of a hydroxyl group, a sulfo group, a carboxyl group, a phosphate group and an ammonium group, and
the heterocyclic group is one selected from the group consisting of pyrrolidine, pyrrole, pyridine, imidazole, pyrolidone, tetrahydrofuran, triazine, thiophene, oxazole, thiazole, phosphole, indole, benzimidazole, quinoline, carbazole, thianthrene, phenoxazine, phenothiazine, xanthene, thieno[3,2-b]thiophene, benzothiophene and phosphindole,

[5] the sulfur-based positive-electrode active material according to the above [1], wherein the polymer is at least one selected from the group consisting of polyvinylpyridine, phosphorylcholine polymer, alkylphenol-sulfur chloride condensate, and polystyrene sulfonic acid,

[6] the sulfur-based positive-electrode active material according to any one of the above [1] to [5], wherein a weight average molecular weight of the polymer is from 2000 to 1500000, preferably from 2000 to 1300000, more preferably from 2000 to 1200000, further preferably from 2000 to 1100000, further preferably from 2000 to 1000000,

[7] the sulfur-based positive-electrode active material according to any one of the above [1] to [6], wherein at the heat treatment, an electrically conductive carbon material is further mixed in addition to the polymer and the sulfur,

[8] the sulfur-based positive-electrode active material according to the above [7], wherein the electrically conductive carbon material is a carbon material having a graphite structure,

[9] the sulfur-based positive-electrode active material according to any one of the above [1] to [8], wherein a total sulfur content in the sulfur-based positive-electrode active material is not less than 50% by mass,

[10] the sulfur-based positive-electrode active material according to any one of the above [1] to [9], wherein the sulfur-based positive-electrode active material is one prepared by a preparation process comprising a step of heat-treating the polymer composed of a monomer unit having at least one hetero atom-containing moiety and sulfur under a non-oxidizing atmosphere, and a heat-treating temperature is from 250° C. to 550° C., preferably from 300° C. to 450° C.,

[11] a sulfur-based positive-electrode active material prepared by a preparation process comprising a step of heat-treating a polymer composed of a monomer unit having at least one hetero atom-containing moiety, and sulfur under a non-oxidizing atmosphere, wherein the hetero atom-containing moiety is a moiety having a group selected from the group consisting of a monovalent functional group having at least one hetero atom selected from the group consisting of O, S, P and N, a heterocyclic group having at least one hetero atom selected from the group consisting of O, S, P and N, and a group represented by —$S_a$— ("a" is an integer of 2 to 4), and
a heat-treating temperature is from 250° C. to 550° C., preferably from 300° C. to 450° C.,

[12] a positive electrode comprising the sulfur-based positive-electrode active material according to any one of the above [1] to [11], and

[13] a lithium ion secondary battery comprising the positive electrode of the above [12].

Effect of the Invention

According to the present invention, it is possible to prepare a novel sulfur-based positive-electrode active material which can largely improve a charging and discharging capacity and cyclability of a lithium-ion secondary battery.

Herein "cyclability" means a property of maintaining a charging and discharging capacity of a secondary battery in spite of repeated charging and discharging. Therefore, while, as the charging and discharging are repeated, a lithium-ion secondary battery in which a degree of reduction of a charging and discharging capacity is large and a capacity retention rate is low is inferior in cyclability, a lithium-ion secondary battery in which a degree of reduction of a charging and discharging capacity is small and a capacity retention rate is high is excellent in cyclability.

DESCRIPTION OF EMBODIMENTS

Figure 1:
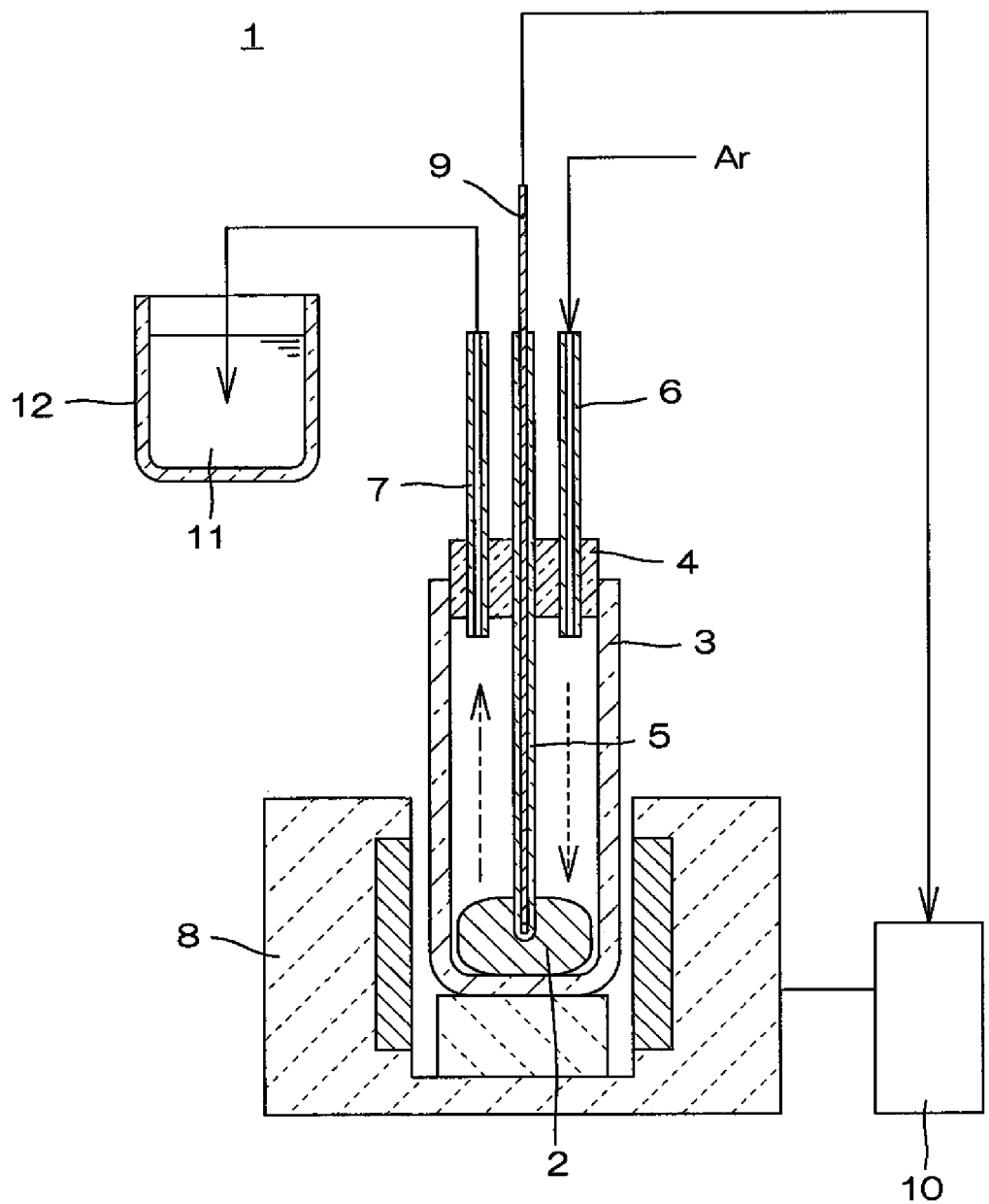
FIG. 1 is a sectional view schematically illustrating a reaction apparatus used for production of a sulfur-based positive-electrode active material in Examples of the present invention.

Embodiments of the present invention are explained below in detail.

The sulfur-based positive-electrode active material of the present invention comprises a carbon skeleton derived from a polymer (hereinafter optionally referred to as "a starting compound") composed of a monomer unit having at least one hetero atom-containing moiety and sulfur incorporated into the carbon skeleton as the carbon skeleton is formed from the polymer by heat treatment, and can be prepared, for example, by a preparation process comprising a step of heat-treating the polymer composed of a monomer unit having at least one hetero atom-containing moiety and sulfur under a non-oxidizing atmosphere.

<Polymer (Starting Compound)>

(Hetero Atom-Containing Moiety)

In the polymer according to the present invention, "a hetero atom-containing moiety" is a moiety having a group selected from the group consisting of a monovalent functional group having at least one hetero atom selected from the group consisting of O, S, P and N, a heterocyclic group having at least one hetero atom selected from the group consisting of O, S, P and N, and a group represented by $-S_a-$ ("a" is an integer of 2 to 4).

Example of "a monovalent functional group having hetero atom selected from the group consisting of O, S, P and N" includes at least one selected from the group consisting of a hydroxyl group, a sulfo group, a carboxyl group, a phosphate group and an ammonium group. The monovalent functional group may have a substituent group.

In this case, examples of the substituent group include the above-mentioned functional groups. Namely, these monovalent functional groups may be further replaced with another monovalent functional group or the same monovalent functional group as above, and the replacement can be made plural times. In that case, a spacer such as an alkylene group may be present between the monovalent functional groups. Examples of the alkylene group include those having 1 to 4 carbon atoms such as methylene, ethylene and trimethylene.

Examples of the "heterocyclic group having hetero atom selected from the group consisting of O, S, P and N" include 5- to 14-membered heterocyclic groups having 1 to 3 hetero atoms selected from the group consisting of O, S, P and N. Here, a heterocyclic ring constituting the heterocyclic group may be, for example, a monocyclic ring such as pyrrolidine, pyrrole, pyridine, imidazole, pyrolidone, tetrahydrofuran, triazine, thiophene, oxazole, thiazole or phosphole, or a polycyclic ring such as indole, benzimidazole, quinoline, carbazole, thianthrene, phenoxazine, phenothiazine, xanthene, thieno[3,2-b]thiophene, benzothiophene or phosphindole, and is selected from the group consisting thereof. These heterocyclic groups may have a substituent group, or may be an unsubstituted group. In the case where the heterocyclic group has a substituent group, examples of the substituent group include the above-mentioned monovalent functional groups.

(Polymer Composed of a Monomer Unit Having at Least One Hetero Atom-Containing Moiety)

Preferred examples of the "polymer composed of a monomer unit having at least one hetero atom-containing moiety" include those represented by the following formula (1) or (2).

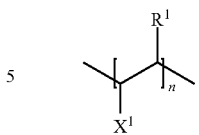

(1)

wherein $R^1$ represents a hydrogen atom or an alkyl group, $X^1$ represents a group having a monovalent functional group having hetero atom selected from the group consisting of O, S, P and N, or a group having a heterocyclic group having hetero atom selected from the group consisting of O, S, P and N, "n" is an integer.

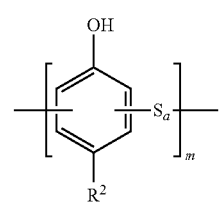

(2)

wherein $R^2$ represents an alkyl group, "a" represents an integer of 2 to 4, "m" represents an integer of 2 to 12.

In the formula (1), the alkyl group of $R^1$ is preferably one having 1 to 4 carbon atoms and is particularly preferably methyl. In the formula (2), the alkyl group of $R^2$ is preferably one having 5 to 12 carbon atoms, more preferably one having 6 to 10 carbon atoms, further preferably one having 7 to 9 carbon atoms, most preferably one having 8 carbon atoms.

Herein the alkyl group is either of one having a straight chain and one having a branched chain, and the one having a straight chain is preferred.

More preferred example of the polymer composed of a monomer unit having at least one hetero atom-containing moiety is not limited particularly and is at least one selected from the group consisting of polyvinylpyridine, phosphorylcholine polymer, alkylphenol-sulfur chloride condensate, and polystyrene sulfonic acid. Further, a preferred polymer is one having hetero atom-containing moiety in its side chain.

Polyvinylpyridine is a compound represented by the following formula (3).

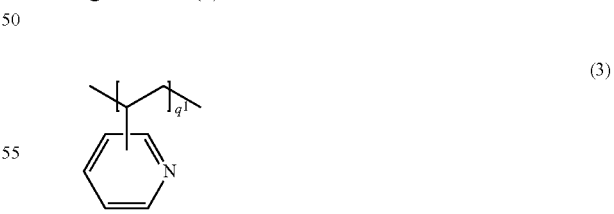

(3)

wherein $q^1$ represents an integer.

There exist, as the above-mentioned polyvinylpyridine, three isomers such as poly(2-vinylpyridine), poly(3-vinylpyridine) and poly(4-vinylpyridine), and among these, poly(4-vinylpyridine) is preferred.

Example of the phosphorylcholine polymer includes a compound (2-methacryloyloxyethyl phosphorylcholine polymer) represented by the following formula (4).

(4)

COOCH$_2$CH$_2$OPO$_3^-$CH$_2$CH$_2$N$^+$(CH$_3$)$_3$ wherein q$^2$ represents an integer.

Example of the alkylphenol-sulfur chloride condensate includes a compound represented by the following formula (5).

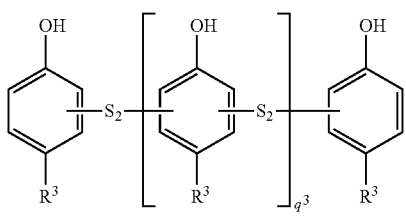

(5)

wherein R$^3$ represents an alkyl group having 5 to 12 carbon atoms, q$^3$ represents an integer.

The alkyl group of R$^3$ is preferably one having 6 to 10 carbon atoms, more preferably one having 7 to 9 carbon atoms, further preferably one having 8 carbon atoms.

The compound represented by the formula (5) is preferably a condensate of octylphenol and sulfur chloride (brand name Tackirol V200 available from Taoka Chemical Co., Ltd.).

Example of the polystyrene sulfonic acid includes a compound represented by the following formula (6).

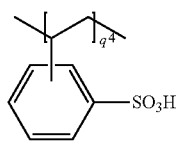

(6)

—SO$_3$H wherein q$^4$ represents an integer.

There exist, as the above-mentioned polystyrene sulfonic acid, three isomers such as poly(o-styrenesulfonic acid), poly(m-styrenesulfonic acid) and poly(p-styrenesulfonic acid), and among these, poly(p-styrenesulfonic acid) is preferred.

(Weight Average Molecular Weight of Polymer (Mw))

Mw of the polymer is preferably from 2000 to 1500000. Since Mw is not less than 2000, there is a tendency that an amount of sulfur to be incorporated into the carbon skeleton derived from the polymer increases during the heat treatment. Meanwhile, there is a tendency that even if Mw exceeds 1500000, the amount of sulfur hardly increases and that since Mw is not more than 1500000, an adequate sulfur content can be achieved. Further, Mw is not more than 1500000, which makes process advantageous, for example, mixing with sulfur is easier. Mw of the polymer is more preferably within a range from 2000 to 1300000, more preferably within a range from 2000 to 1200000, further preferably within a range from 2000 to 1100000, still further preferably within a range from 2000 to 1000000. Mw is a value (calibrated based on polystyrene) measured by gel permeation chromatography (GPC).

(Preparation of Polymer)

The polymer is commercially available or can be prepared by a usual process within a scope of knowledge of a person ordinarily skilled in the art.

<Step of Heat Treatment>

The heat treatment of the starting compound can be carried out by mixing the compound with sulfur and heat-treating the mixture under a non-oxidizing atmosphere. Here in the case of the starting compound being a solid, its reactivity with sulfur can be increased by pulverizing the compound and then mixing with sulfur. By the heat treatment, the target sulfur-based positive-electrode active material of the present invention can be prepared.

(Sulfur)

Sulfur in various forms such as powdery sulfur, insoluble sulfur, precipitated sulfur, colloidal sulfur and the like may be used. It is noted that from the viewpoint of uniform dispersion of sulfur into the starting compound, colloidal sulfur which is fine particles is preferred. The compounding ratio of sulfur is preferably not less than 250 parts by mass, more preferably not less than 300 parts by mass based on 100 parts by mass of the starting compound. Since the compounding ratio is not less than 250 parts by mass, there is a tendency that a charging and discharging capacity and cyclability can be increased. On the other hand, while there is no upper limit of the compounding ratio of sulfur, the compounding ratio is usually not more than 1500 parts by mass, preferably not more than 1000 parts by mass. Even if the ratio exceeds 1500 parts by mass, there is a tendency that a charging and discharging capacity or cyclability can not be improved sufficiently, and there is a tendency that the ratio of not more than 1500 parts by mass is advantageous from the viewpoint of cost.

(Electrically-Conductive Carbon Material)

When mixing the starting compound with sulfur, a carbon material having electric conductivity may be further added for the purpose of enhancing electric conductivity of the obtained sulfur-based positive-electrode active material. A carbon material having a graphite structure is preferable as such an electrically-conductive carbon material. Examples of usable carbon material include carbon materials having a fused aromatic ring structure such as carbon black, graphite, carbon nanotube (CNT), carbon fiber (CF), graphene, fullerene and the like. One or more thereof can be used as the electrically conductive carbon material.

Among them, carbon black is preferable since it is inexpensive and excellent in dispersibility. Also, a small amount of CNT or graphene may be combined with carbon black. In accordance with such combination, cyclability of a lithium-ion secondary battery can be further improved without largely increasing a cost. The combined amount of CNT or graphene is preferably not less than 8% by mass and not more than 12% by mass based on the total amount of electrically-conductive carbon material.

The compounding ratio of the electrically conductive carbon material is preferably not less than 5 parts by mass, more preferably not less than 10 parts by mass based on 100 parts by mass of the starting compound. Since the compounding ratio is not less than 5 parts by mass, a purpose of further enhancing a charging and discharging capacity and cyclability tends to be easily achieved. On the other hand, the compounding ratio is preferably not more than 50 parts by mass, more preferably not more than 30 parts by mass. Since the compounding ratio is not more than 50 parts by mass, there is a tendency that a purpose of further enhancing a charging and discharging capacity and cyclability is easily achieved without relatively lowering a ratio of a sulfur-containing structure in the sulfur-based positive-electrode active material.

(Conditions for Heat Treatment)

Heat treatment is performed by heating under a non-oxidizing atmosphere. The non-oxidizing atmosphere means an atmosphere substantially containing no oxygen and is used to prevent an oxidative deterioration or an excess thermal decomposition of the components. Specifically, the heat treatment is carried out under an inert gas atmosphere in a silica tube filled with an inert gas such as nitrogen or argon. The temperature of the heat treatment is preferably within a range from 250° C. to 550° C. Since the heat-treating temperature is not less than 250° C., there is a tendency that an insufficient sulfurizing reaction is avoided and lowering of a charging and discharging capacity of the target product can be prevented. On the other hand, when not more than 550° C., there is a tendency that decomposition of the starting compound can be prevented and decrease in yield and lowering of a charging and discharging capacity can be prevented. The heat-treating temperature is preferably not less than 300° C., more preferably not less than 450° C. A period of time for the heat treatment is preferably 2 to 6 hours. When the heat-treating time is not less than 2 hours, there is a tendency that the heat treatment can be advanced sufficiently, and when the heat-treating time is not more than 6 hours, there is a tendency that excessive thermal decomposition of the components can be prevented. The sulfur-based positive-electrode active material can also be produced by heat-treating while kneading the starting compound, sulfur and the like in a continuous apparatus such as a twin-screw extruder.

(Sulfur Removing Step)

In the treated product obtained after the heat treatment, there remains a so-called unreacted sulfur which results from cooling and deposition of sulfur sublimated at the heat treatment. It is desirable to remove such unreacted sulfur as much as possible since it causes deterioration of cyclability. Unreacted sulfur can be removed by usual methods, for example, a removal by heating under a reduced pressure, a removal by warm wind, a removal by washing with a solvent and the like.

(Pulverization, and Classification)

The produced sulfur-based positive-electrode active material is pulverized so as to be predetermined grain sizes and is classified to be particles suitable for production of a positive electrode. A preferred particle size distribution of the particles is from about 5 to 20 μm in a median size. It is noted that in the above-explained heat treatment method using a twin-screw extruder, the produced sulfur-based positive-electrode active material can also be pulverized at the same time due to shearing at kneading.

<Sulfur-Based Positive-Electrode Active Material>

The thus obtained sulfur-based positive-electrode active material is mainly composed of carbon and sulfur and as the content of sulfur increases, a charging and discharging capacity and cyclability tend to be improved. Therefore, there is a tendency that the content of sulfur as large as possible is preferable. The content of sulfur in the sulfur-based positive-electrode active material is preferably not less than 50% by mass. In the case where an electrically conductive carbon material is compounded, even if the sulfur content is below 50% by mass, an effect of enhancing a charging and discharging capacity and cyclability can be expected due to an influence of carbon constituting the electrically conductive carbon material. In such a case, the sulfur content is preferably not less than 45% by mass in the sulfur-based positive-electrode active material.

By the heat treatment, hydrogen (H) in the starting compound reacts with sulfur to be hydrogen sulfide, as a result, decreasing in the resultant sulfide. It is preferable that the content of hydrogen in the sulfur-based positive-electrode active material is not more than 1.6% by mass. In the case of not more than 1.6% by mass, there is a tendency that the heat treatment (sulfurization) was carried out sufficiently. Therefore, in that case, a charging and discharging capacity tends to be enhanced. The content of hydrogen is more preferably not more than 1.0% by mass, further preferably not more than 0.5% by mass, further preferably not more than 0.1% by mass.

Herein contents of elements are measured by elemental analysis in accordance with a usual method.

<Lithium-Ion Secondary Battery>

The sulfur-based positive-electrode active material of the present invention can be used as the positive-electrode active material of the lithium-ion secondary battery. The lithium-ion secondary battery of the present invention using the sulfur-based positive-electrode active material has a large charging and discharging capacity and is excellent in cyclability.

The lithium-ion secondary battery of the present invention can be produced by a usual method using a positive electrode comprising the sulfur-based positive-electrode active material, a negative electrode, an electrolyte, and further members such as a separator as desired.

<Positive Electrode>

The positive electrode of the lithium-ion secondary battery can be produced in the same manner as in a general positive electrode of a lithium-ion secondary battery except that the above sulfur-based positive-electrode active material is used as a positive-electrode active material. For example, a particulate of the sulfur-based positive-electrode active material is mixed with an electrically-conductive additive, a binder and a solvent to prepare a paste-like positive-electrode active material and the positive-electrode active material is applied on a current collector and dried to produce a positive electrode. Otherwise, it is also possible that the sulfur-based positive-electrode active material of the present invention is kneaded together with an electrically-conductive additive, a binder and a small amount of solvent using a mortar or the like, and the kneaded mixture is formed into a film shape and then pressed against a current collector using a pressing machine or the like to produce a positive electrode.

(Electrically-Conductive Additive)

Examples of an electrically-conductive additive include vapor grown carbon fibers (Vapor Grown Carbon Fibers: VGCF), carbon powders, carbon black (CB), acetylene black (AB), KETJENBLACK (KB), graphite, fine powders of metals being stable at positive-electrode potentials, such as aluminum and titanium and the like. One or more thereof can be used as the conductive additive.

(Binder)

Examples of a binder include polyvinylidene difluoride (PVDF), polytetrafluoroethylene (PTFE), styrene-butadiene rubber (SBR), polyimide (PI), polyamide-imide (PAI), carboxymethyl cellulose (CMC), polyvinyl chloride (PVC), methacryl resins (PMA), polyacrylonitrile (PAN), modified polyphenylene oxide (PPO), polyethylene oxide (PEO), polyethylene (PE), polypropylene (PP) and the like. One or more thereof can be used as the binder.

(Solvent)

Examples of a solvent include N-methyl-2-pyrrolidone, N,N-dimethylformaldehyde, alcohols, water and the like. One or more thereof can be used as the solvent.

(Compounding Ratio)

The compounding ratio of each of the above components constituting the positive electrode is not limited particularly but for example, it is preferable to compound 20 to 100 parts by mass of an electrically-conductive additive, 10 to 20 parts by mass of a binder and an appropriate amount of a solvent based on 100 parts by mass of the sulfur-based positive-electrode active material.

(Current Collector)

As for a current collector, those which have been used commonly on positive electrodes for a lithium-ion secondary battery may be used. Examples of a current collector include aluminum foils, aluminum meshes, punched aluminum sheets, aluminum expanded sheets, stainless-steel foils, stainless-steel meshes, punched stainless-steel sheets, stainless-steel expanded sheets, foamed nickel, nickel nonwoven fabrics, copper foils, copper meshes, punched copper sheets, copper expanded sheets, titanium foils, titanium meshes, carbon nonwoven fabrics, carbon woven fabrics and the like. Among these, a carbon nonwoven fabric current collector and a carbon woven fabric current collector, which are composed of carbon with a high graphitization degree, are suitable for a current collector in the case of using the sulfur-based positive-electrode active material as a positive-electrode active material because it does not include hydrogen and has low reactivity to sulfur. As for a starting material for a carbon fiber with a high graphitization degree, it is possible to use various types of pitches (namely, the byproducts of petroleum, coal, coal tar, and so on) that make a material for carbon fibers, or polyacrylonitrile (PAN) fibers and the like.

(Negative Electrode)

Examples of a negative electrode material include known metallic lithium, carbon-based materials such as graphite, silicon-based materials such as a silicon thin film, alloy-based materials such as copper-tin or cobalt-tin and the like. Among the above-mentioned negative electrode materials, in the case where a carbon-based material, a silicon-based material, an alloy-based material or the like that does not include lithium is used, it is advantageous from a point that short-circuiting between positive and negative electrodes, which results from production of dendrite, is less likely to arise. However, in the case where a negative electrode material that does not include lithium is used in combination with the positive electrode of the present invention, neither the positive electrode nor the negative electrode includes lithium and thus a pre-doping treatment, in which lithium is inserted into either one of the negative electrode or positive electrode, or into both of them, becomes necessary. For a method of lithium pre-doping, a publicly known method can be used. For example, in the case where a negative electrode is doped with lithium, the following methods of inserting lithium can be given: an electrolytically-doping method, in which a half-cell is assembled using metallic lithium as the counter electrode and then doping lithium electrochemically; and an application pre-doping method, in which doping is done by a diffusion of lithium onto an electrode by applying a metallic lithium foil onto the electrode and then leaving the electrode with the metallic lithium foil applied as it is within an electrolytic solution. Moreover, in another case as well where the positive electrode is pre-doped with lithium, it is possible to utilize the aforementioned electrolytically-doping method. Silicon-based materials, which are high capacity negative electrode materials, are preferred as a negative electrode material that does not include lithium. Among them, a silicon thin film that can make a thickness of the electrode thinner and is advantageous in capacity per volume is particularly preferable.

(Electrolyte)

As for an electrolyte to be used on the lithium-ion secondary battery, it is possible to use those in which an alkali-metal salt serving as an electrolyte is dissolved in an organic solvent. Examples of a preferred organic solvent include at least one selected from nonaqueous solvents, such as ethylene carbonate, propylene carbonate, dimethyl carbonate, diethyl carbonate, ethyl methyl carbonate, dimethyl ether, γ-butyrolactone, and acetonirile. Examples of a usable electrolyte include $LiPF_6$, $LiBF_4$, $LiAsF_6$, $LiCF_3SO_3$, LiI, $LiClO_4$ and the like. A concentration of the electrolyte can be from about 0.5 mol/liter to 1.7 mol/liter. It is noted that the electrolyte is not limited to a liquid form. For example, in the case where the lithium-ion secondary battery is a lithium polymer secondary battery, the electrolyte is a solid form (for example, a form of polymer gel).

(Separator)

In addition to the above-described negative electrode, positive electrode and electrolyte, the lithium-ion secondary battery can be further equipped with the other members, such as separators, as well. A separator intervenes between the positive electrode and the negative electrode, thereby not only allowing the movements of ions between the positive electrode and the negative electrode but also functioning to prevent the positive electrode and the negative electrode from internally short-circuiting one another. When the lithium-ion secondary battery is a hermetically-closed type, a function of retaining the electrolytic solution is required for the separator. As for a separator, it is preferable to use a thin-thickness and microporous or nonwoven-shaped film that is made of a material, such as polyethylene, polypropylene, polyacrylonitrile, aramid, polyimide, cellulose, glass and the like.

(Shape)

A configuration of the lithium-ion secondary battery is not limited particularly, and can be formed as a variety of configurations, such as cylindrical types, laminated types, coin types, button types and the like.

EXAMPLE

The present invention is explained by means of Examples, but is not limited to the Examples.

Various chemicals used herein are collectively shown below. The various chemicals were subjected to purification according to necessity by a usual method.

<Materials Used for Test>

Rubber: Natural rubber (TSR20)
Polymer 1: Polyvinylpyridine (a reagent available from SIGMA-ALDRICH)
Polymer 2: Condensate of octylphenol and sulfur chloride (brand name Tackirol V200 available from Taoka Chemical Co., Ltd.)
Polymer 3: 2-Methacryloyloxyethyl phosphorylcholine polymer
Polymer 4: Poly(p-styrenesulfonic acid) (a reagent available from Wako Pure Chemical Industries, Ltd.)
Carbon black: Acetylene black (Denka black (registered trademark) available from DENKI KAGAKU KOGYO KABUSHIKI KAISHA Sulfur: Colloidal sulfur available from Tsurumi Chemical Industry Co., Ltd.

Comparative Example 1

<Production of Positive-Electrode Active Material>
(Preparation of Starting Compound)

To 100 parts by mass of natural rubber was compounded 500 parts by mass of sulfur and the compounded mixture was kneaded using a kneading testing device [MIX-LABO manufactured by Moriyama Company, Ltd.] to prepare a starting compound. The thus obtained starting compound was cut into small pieces of not more than 3 mm using scissors and then was subjected to heat treatment.

(Reaction Apparatus)

A reaction apparatus 1 as illustrated in FIG. 1 was used for heat treatment of the starting compound. The reaction apparatus 1 comprises a reaction container 3, which has an outer diameter of 60 mm, an inner diameter of 50 mm and a height of 300 mm and is made of quartz glass, that is formed as a bottomed cylindrical shape to contain and heat-treat the starting compound 2; a silicone plug 4 for closing an upper opening of the reaction container 3; one alumina protection tube 5 ("Alumina SSA-S" available from NIKKATO CORPORATION, an outer diameter of 4 mm, an inner diameter of 2 mm and a length of 250 mm) and two tubes, which are a gas introducing tube 6 and a gas exhausting tube 7 (both are "Alumina SSA-S" available from NIKKATO CORPORATION, an outer diameter of 6 mm, an inner diameter of 4 mm and a length of 150 mm), these three tubes penetrating through the plug 4; and an electric furnace 8 (crucible furnace, width of an opening: 80 mm dia., heating height: 100 mm) for heating the reaction container 3 from the bottom side.

The alumina protection tube 5 is formed in such a length that the lower part below plug 4 reaches the starting compound 2 contained in the bottom of the reaction container 3 and a thermocouple 9 is inserted through the inside of the alumina protection tube 5. The alumina protection tube 5 is used as a protective tube for the thermocouple 9. The leading end of the thermocouple 9 is inserted into the starting compound 2 while being protected by the closed leading end of the alumina protection tube 5 and functions to measure a temperature of the starting compound 2. Output of the thermocouple 9 is input in a temperature controller 10 of the electric furnace 8 as shown by the solid arrow in the drawing and the temperature controller 10 functions to control a heating temperature of the electric furnace 8 based on the input from the thermocouple 9.

The gas introducing tube 6 and the gas exhausting tube 7 are formed such that the bottom end thereof projects in 3 mm downwardly from the plug 4. Also, the upper part of the reaction container 3 projects from the electric furnace 8 to be exposed to atmosphere. Therefore, steam of sulfur generating from the starting compound due to heating of the reaction container 3 is raised to the upper part of the reaction container 3 as shown by the long dashed short dashed line arrow in the drawing, and transformed to a liquid drop while being cooled to be dropped and refluxed as shown by the broken line arrow in the drawing. Consequently, sulfur in the reaction system does not leak to the outside through the gas exhausting tube 7.

The gas introducing tube 6 is continuously supplied with Ar gas from a gas supply system which is not shown. The gas exhausting tube 7 is connected to a trapping bath 12 containing an aqueous solution 11 of sodium hydroxide. The exhaust gas moving toward the outside through the gas exhausting tube 7 from the reaction container 3 is released to the outside after passing through the aqueous solution 11 of sodium hydroxide in the trapping bath 12. Therefore, even if hydrogen sulfide gas generated from a vulcanization reaction is included in the exhaust gas, the hydrogen sulfide gas is removed therefrom by being neutralized with the aqueous solution of sodium hydroxide.

(Heat Treatment Step)

Heating with the electric furnace 8 was started 30 minutes after starting a continuous supply of Ar gas to the reaction container 3 holding the starting compound 2 in its bottom at a flow rate of 80 ml/min from the gas supply system. The temperature elevation rate was 5° C./min. Since generation of gas was started when the temperature of the starting compound became 200° C., the heating was continued while adjusting the flow rate of the Ar gas such that the flow rate of the exhaust gas became as constant as possible. When the temperature of the starting compound reached 400° C., heat treatment was conducted for two hours while maintaining the temperature of 400° C. Then, the starting compound 2 was cooled naturally under an Ar gas atmosphere to 25° C. while adjusting the flow rate of the Ar gas and a reaction product was taken out of the reaction container 3.

(Removal of Unreacted Sulfur)

In order to remove the unreacted sulfur (free elemental sulfur) remaining in the product after the heat treatment step, the following step was carried out. Namely, the product was pulverized in a mortar and 2 g of a pulverized product was put in a glass tube oven and heated for three hours at 250° C. while vacuum suction was conducted to produce a sulfur-based positive-electrode active material in which unreacted sulfur was removed (or only a trace amount of unreacted sulfur was contained). The temperature elevation rate was 10° C./min.

<Preparation of Lithium-Ion Secondary Battery>
(Positive Electrode)

To 3 mg of the sulfur-based positive-electrode active material as produced above were added 2.7 mg of acetylene black as an electrically-conductive additive, 0.3 mg of polytetrafluoroethylene as a binder and an appropriate amount of hexane, and the mixture was kneaded in an agate mortar till the mixture turned into a film shape. Then the entire amount of the kneaded product in a film shape in the mortar was put on an aluminum mesh as a current collector with #100 in mesh roughness that had been punched out to a circle with 14 mm in diameter, and after being press-fitted with a table pressing machine, the film was dried for three hours at 100° C. to form a positive electrode.

(Negative Electrode)

A metallic lithium foil [manufactured by Honjo Metal Co., Ltd.] having a thickness of 0.5 mm was punched out to a circle with 14 mm in diameter to prepare a negative electrode.

(Electrolyte)

A nonaqueous electrolyte in which $LiPF_6$ had been dissolved in a mixed solvent of ethylene carbonate and diethyl carbonate was used as an electrolyte. A volume ratio of ethylene carbonate and diethyl carbonate was 1:1. A concentration of $LiPF_6$ was 1.0 mol/liter.

(Lithium-Ion Secondary Battery)

Using the above positive electrode, negative electrode and electrolyte, a coin-type lithium-ion secondary battery was prepared in a dry room. Specifically, a separator [Celgard (registered trademark) 2400 manufactured by Celgard] consisted of a polypropylene microporous film with 25 μm in thickness and a glass nonwoven filter with 500 μm in thickness were sandwiched between the positive electrode and the negative electrode to form an electrode-assembly battery.

Then, the formed electrode-assembly battery was accommodated in a battery case (e.g., a member for CR2032-type coin battery, a product of HOSEN Co., Ltd.) made of a stainless-steel container and the electrolyte solution was added thereto. After that, the battery case was sealed hermetically with a crimping machine, thereby obtaining a coin-type lithium-ion secondary battery.

Examples 1 to 5

Starting compounds, sulfur-based positive-electrode active materials and lithium-ion secondary batteries were prepared in the same manner as in Comparative Example 1 except that the starting compounds were prepared in accordance with the formulations shown in Table 1. Before subjecting the starting compounds to heat treatment, they were pulverized for three minutes with a cutter mill ("Labo Millser LM-Plus" available from Osaka Chemical Co., Ltd.) and used in a form of powder. The starting compounds were also dried for two hours with a vacuum pump ("a small size single stage vacuum pump (with a solenoid valve)" available from FUSO CORPORATION) before use in order to remove moisture therefrom.

Comparative Examples 2 and 3

Starting compounds, sulfur-based positive-electrode active materials and lithium-ion secondary batteries were prepared in the same manner as in Comparative Example 1 except that the starting compounds were prepared in accordance with the formulations shown in Table 1 and the heat-treating temperature was changed as shown in Table 1. Before subjecting the starting compounds to heat treatment, they were pulverized for three minutes with a cutter mill ("Labo Millser LM-Plus" available from Osaka Chemical Co., Ltd.) and used in a form of powder. The starting compounds were also dried for two hours with a vacuum pump ("a small size single stage vacuum pump (with a solenoid valve)" available from FUSO CORPORATION) before use in order to remove moisture therefrom.

<Measurement of Discharging Capacity and Capacity Retention Rate>

With respect to each coin-type lithium-ion secondary battery prepared in Examples and Comparative Examples, charging and discharging were carried out at an electric-current value equivalent to 33.3 mA per 1 g of the positive-electrode active material under a condition of a test temperature of 30° C.

The discharge termination voltage was 1.0 V and the charging termination voltage was 3.0 V. Charging and discharging was repeated 50 times. The test was started from discharging, and each discharging capacity (mAh/g) was measured and a discharging capacity (mAh/g) at the second discharging was regarded as an initial capacity. The larger the initial capacity is, the larger the charging and discharging capacity of the lithium-ion secondary battery is, which is evaluated as preferable. Moreover, from a discharging capacity $DC_{10}$ (mAh/g) at the tenth discharging and a discharging capacity $DC_{20}$ (mAh/g) at the twentieth discharging, a capacity retention rate (%) was calculated by the formula (a).

$$\text{Capacity retention rate (\%)} = (DC_{20}/DC_{10}) \times 100 \quad (a)$$

As explained above, it can be said that the higher the capacity retention rate is, the more excellent cyclability of the lithium-ion secondary battery is.

<Elemental Analysis>

An elemental analysis of sulfur-based positive-electrode active materials produced in Examples and Comparative Examples was carried out.

As for carbon, hydrogen and nitrogen, a mass ratio (%) based on a total amount of a sulfur-based positive-electrode active material was calculated from a mass amount measured with a full automatic elemental analysis device vario MICRO cube manufactured by Elementar Analysensysteme GmbH. As for sulfur, a mass ratio (%) based on a total amount of a sulfur-based positive-electrode active material was calculated from a mass amount measured with an ion chromatograph device DX-320 manufactured by Dionex Corporation using a column (IonPac AS12A) manufactured by the same Corporation. For phosphorus, a mass ratio (%) based on a total amount of a sulfur-based positive-electrode active material was calculated from a mass amount measured with an inductively coupled plasma spectrometer manufactured by Hitachi High-Tech Science Corporation.

TABLE 1

|  | Com. Ex. | Example | | | | | Com. Ex. | |
| --- | --- | --- | --- | --- | --- | --- | --- | --- |
|  | 1 | 1 | 2 | 3 | 4 | 5 | 2 | 3 |
| Formulation (part by mass) | | | | | | | | |
| Rubber | 100 | — | — | — | — | — | — | — |
| Polymer 1 | — | 100 | — | — | — | 100 | 100 | 100 |
| Polymer 2 | — | — | 100 | — | — | — | — | — |
| Polymer 3 | — | — | — | 100 | — | — | — | — |
| Polymer 4 | — | — | — | — | 100 | — | — | — |
| Carbon black | — | — | — | — | — | 10 | — | — |
| Sulfur | 500 | 500 | 500 | 500 | 500 | 500 | 500 | 500 |
| Mw of polymer | 900000 | 160000 | 9000 | 50000 | 1000000 | 160000 | 160000 | 160000 |
| Heat-treating temp. | 400 | 400 | 400 | 400 | 400 | 400 | 200 | 600 |
| Evaluation | | | | | | | | |
| Discharging capacity (mAh/g) | | | | | | | | |
| First time | 693 | 711 | 891 | 502 | 556 | 765 | 303 | 216 |
| Second time | 344 | 405 | 572 | 273 | 301 | 442 | 162 | 135 |
| Tenth time | 245 | 400 | 456 | 265 | 283 | 436 | 150 | 120 |
| Twentieth time | 211 | 400 | 432 | 263 | 278 | 435 | 121 | 108 |
| Capacity retention rate (%) | 86 | 100 | 95 | 99 | 98 | 100 | 81 | 90 |

TABLE 1-continued

|   | Com. Ex. 1 | Example 1 | Example 2 | Example 3 | Example 4 | Example 5 | Com. Ex. 2 | Com. Ex. 3 |
|---|---|---|---|---|---|---|---|---|
| Elemental analysis (%) | | | | | | | | |
| C | 44.1 | 39.8 | 38.2 | 39.6 | 42.1 | 46.2 | 56.2 | 65.3 |
| H | 0.2 | 0.5 | 0.5 | 0.3 | 0.3 | 0.5 | 1.6 | 0.1 |
| N | 0.4 | 6.2 | 0.0 | 1.3 | 0.1 | 5.6 | 7.2 | 4.2 |
| S | 54.4 | 52.7 | 58.4 | 50.1 | 54.5 | 50.3 | 38.7 | 29.6 |
| O | 0.1 | 0.0 | 2.1 | 7.1 | 0.0 | 0.1 | 0.2 | 0.1 |
| P | 0.0 | 0.0 | 0.0 | 2.5 | 0.0 | 0.0 | 0.0 | 0.0 |

Table 1 indicates that in Examples 1 to 5, larger initial capacity (mAh/g) and capacity retention rate (%) are shown compared to Comparative Example 1. A capacity retention rate of not less than 95% is regarded as satisfactory.

Figure 2:
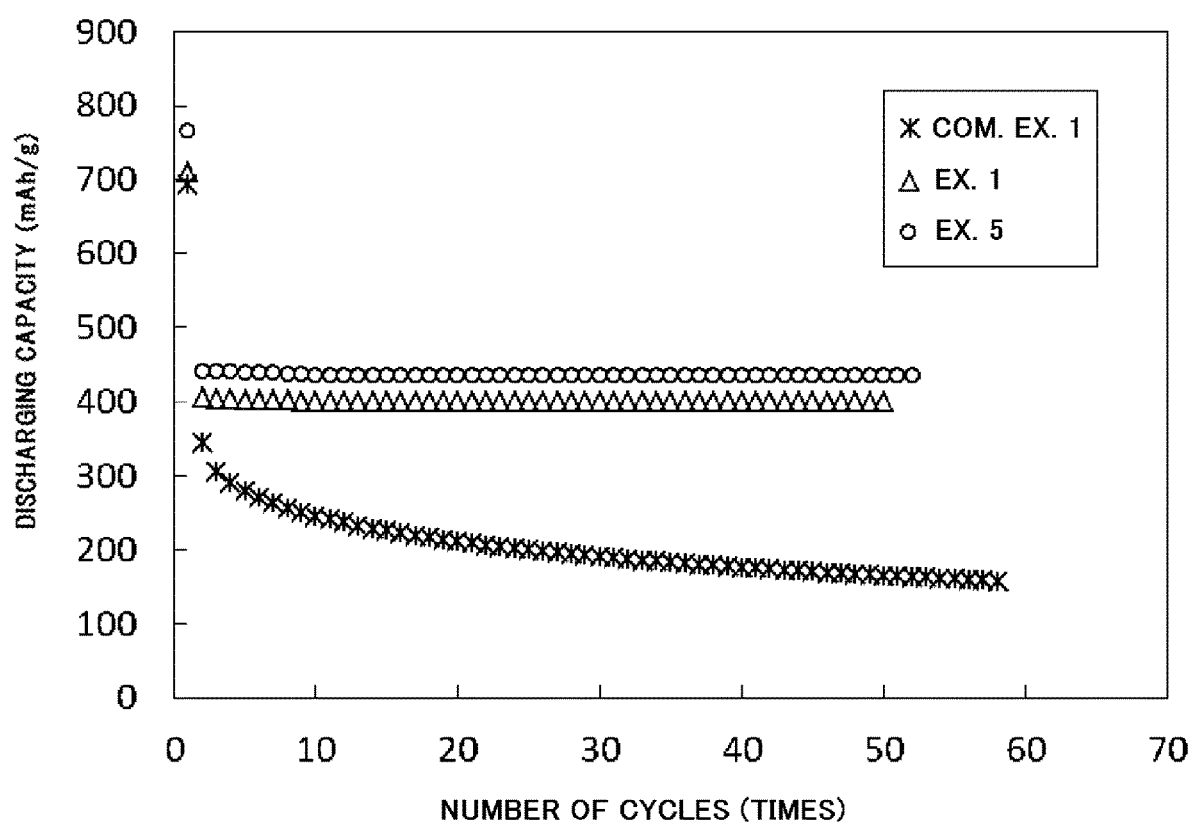
FIG. 2 is a graph showing a result of cyclic charging and discharging in Comparative Example 1, and Examples 1 and 5.

A variation of an electric capacity resulting from cycle charging and discharging in Comparative Example 1 and Examples 1 and 5 is shown in FIG. 2. In Examples 1 and 5, both of initial capacity and a capacity retention rate are high compared to Comparative Example 1. Particularly in Example 5 where carbon black was added, the electric capacity was improved compared to Example 1. From the results of Example 1 and Comparative Examples 2 and 3, it is found that high battery performance cannot be obtained in either cases of too low and too high heat-treating temperatures.

INDUSTRIAL APPLICABILITY

The present invention can provide a novel sulfur-based positive-electrode active material which can largely improve a charging and discharging capacity and cyclability of a lithium-ion secondary battery.

EXPLANATION OF SYMBOLS

1 Reaction apparatus
2 Starting compound
3 Reaction container
4 Silicone plug
5 Alumina protection tube
6 Gas introducing tube
7 Gas exhausting tube
8 Electric furnace
9 Thermocouple
10 Temperature controller
11 Aqueous solution of sodium hydroxide
12 Trapping bath

The invention claimed is:

1. A method for making a sulfur-based positive-electrode active material comprising:
a step of providing a polymer composed of a monomer unit comprising at least one hetero atom-containing moiety, and
a step of heat-treating the polymer and sulfur under a non-oxidizing atmosphere at a temperature within a range from 250° C. to 550° C.,
wherein the polymer is at least one selected from the group consisting of polyvinylpyridine, phosphorylcholine polymer, alkylphenol-sulfur chloride condensate and polystyrene sulfonic acid.

2. A method for making a positive-electrode comprising:
producing a positive-electrode according to the method for making the sulfur-based positive-electrode active material of claim 1.

3. A method for making a lithium-ion secondary battery comprising:
producing a lithium-ion secondary battery according to the method for making the positive electrode of claim 2.

4. The method for making the sulfur-based positive-electrode active material of claim 1, wherein the polymer composed of a monomer unit comprising at least one hetero atom-containing moiety is a polyvinylpyridine represented by the following formula (3),

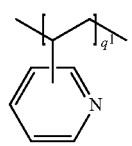

(3)

wherein $q^1$ represents an integer.

5. The method for making the sulfur-based positive-electrode active material of claim 1, wherein the polymer composed of a monomer unit comprising at least one hetero atom-containing moiety is a phosphorylcholine polymer represented by the following formula (4),

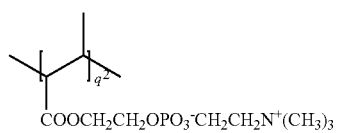

(4)

$COOCH_2CH_2OPO_3^-CH_2CH_2N^+(CH_3)_3$ wherein $q^2$ represents an integer.

6. The method for making the sulfur-based positive-electrode active material of claim 1, wherein the polymer composed of a monomer unit comprising at least one hetero atom-containing moiety is a alkylphenol-sulfur chloride condensate represented by the following formula (5),

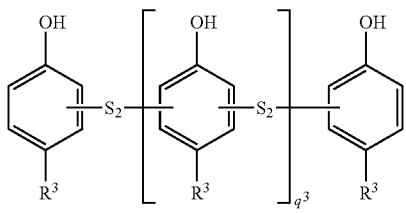 (5)

wherein $R^3$ represents an alkyl group having 5 to 12 carbon atoms, $q^3$ represents an integer.

7. The method for making the sulfur-based positive-electrode active material of claim 1, wherein the polymer composed of a monomer unit comprising at least one hetero atom-containing moiety is a polystyrene sulfonic acid represented by the following formula (6),

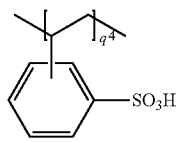 (6)

wherein $q^4$ represents an integer.

8. The method for making the sulfur-based positive-electrode active material of claim 1, wherein the polymer is at least one selected from the group consisting of phosphorylcholine polymer and polystyrene sulfonic acid.

9. The method for making the sulfur-based positive-electrode active material of claim 1, wherein the temperature of the step of heat-treating is from 300° C. to 450° C.

10. The method for making the sulfur-based positive-electrode active material of claim 1, wherein a weight average molecular weight of the polymer is from 2000 to 1500000.

11. The method for making the sulfur-based positive-electrode active material of claim 1, wherein during the step of heat-treating, an electrically conductive carbon material is further mixed in addition to the polymer and the sulfur.

12. The method for making the sulfur-based positive-electrode active material of claim 1, wherein the electrically conductive carbon material is a carbon material comprising a graphite structure.

13. The method for making the sulfur-based positive-electrode active material of claim 1, wherein a total content of the sulfur in the sulfur-based positive-electrode active material is not less than 50% by mass.

* * * * *